United States Patent
Shim

(10) Patent No.: US 11,180,406 B2
(45) Date of Patent: Nov. 23, 2021

(54) GLASS BENDING MOLD, GLASS BENDING APPARATUS INCLUDING THE SAME, AND METHOD OF BENDING GLASS

(71) Applicant: Samsung Display Co., Ltd., Yongin-si (KR)

(72) Inventor: Byoung Yul Shim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 162 days.

(21) Appl. No.: 16/215,869

(22) Filed: Dec. 11, 2018

(65) Prior Publication Data

US 2019/0276347 A1   Sep. 12, 2019

(30) Foreign Application Priority Data

Mar. 8, 2018  (KR) .................. 10-2018-0027266

(51) Int. Cl.
*C03B 23/03* (2006.01)
(52) U.S. Cl.
CPC ...... *C03B 23/0307* (2013.01); *C03B 23/0302* (2013.01); *C03B 23/0305* (2013.01)
(58) Field of Classification Search
CPC ..... C03B 23/02; C03B 23/03; C03B 23/0307; C03B 23/0302; C03B 23/0305
See application file for complete search history.

(56) References Cited

U.S. PATENT DOCUMENTS

| | | | |
|---|---|---|---|
| 2010/0229602 A1* | 9/2010 | Ross ................... | C03B 23/0252 65/107 |
| 2011/0126588 A1* | 6/2011 | Malach ............... | C03B 23/0252 65/30.1 |
| 2011/0265517 A1* | 11/2011 | Keebler .................... | B24B 9/10 65/30.13 |
| 2015/0000339 A1 | 1/2015 | Jang et al. | |
| 2015/0000340 A1 | 1/2015 | Jang et al. | |
| 2017/0349473 A1* | 12/2017 | Moriya .................... | C03B 23/03 |
| 2019/0135677 A1* | 5/2019 | Fukushi .................. | C03B 29/08 |

FOREIGN PATENT DOCUMENTS

| KR | 20140059488 A * | 5/2014 |
|---|---|---|
| KR | 10-1433072 | 8/2014 |
| KR | 10-2014-0111403 | 9/2014 |
| KR | 10-2015-0001955 | 1/2015 |
| KR | 10-2015-0001964 | 1/2015 |
| KR | 10-1648726 | 8/2016 |
| KR | 10-1697467 | 1/2017 |
| KR | 10-1715606 | 3/2017 |

* cited by examiner

*Primary Examiner* — Cynthia Szewczyk
(74) *Attorney, Agent, or Firm* — H.C. Park & Associates, PLC

(57) ABSTRACT

A glass bending apparatus configured to at least partially bend glass in a first direction includes a first mold and guide blocks. The first mold includes guide block insert holes. The guide blocks are respectively inserted into the guide block insert holes. The guide blocks are spaced apart from each other in a second direction intersecting the first direction.

20 Claims, 20 Drawing Sheets

FIG. 9
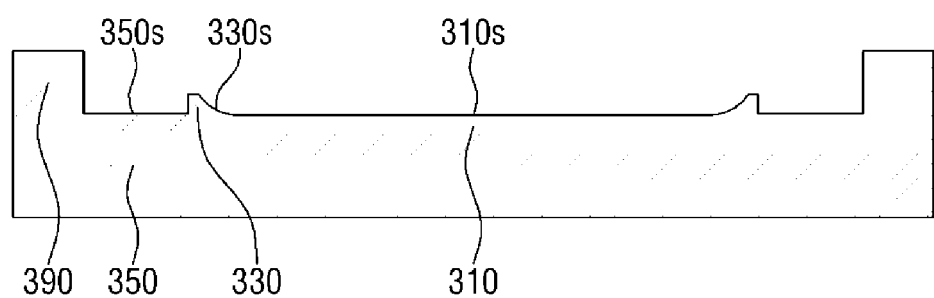
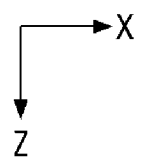

FIG. 11
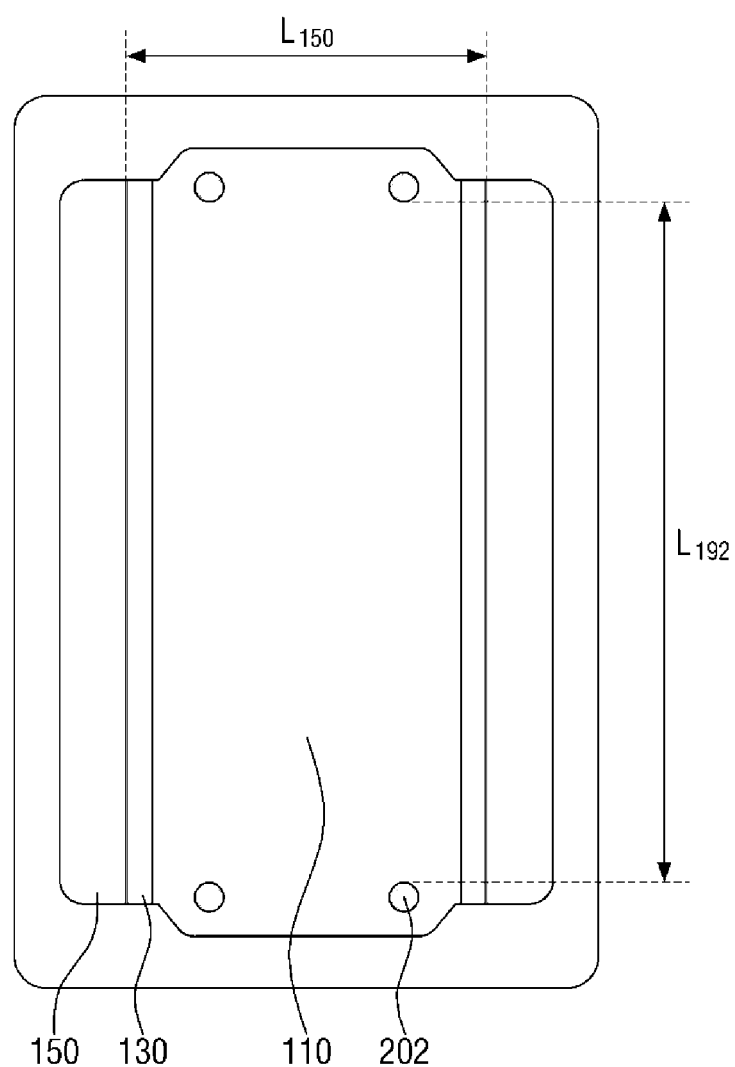
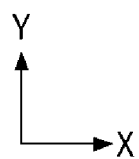

GLASS BENDING MOLD, GLASS BENDING APPARATUS INCLUDING THE SAME, AND METHOD OF BENDING GLASS

This application claims priority from and the benefit of Korean Patent Application No. 10-2018-0027266, filed Mar. 8, 2018, which is hereby incorporated by reference for all purposes as if fully set forth herein.

BACKGROUND

Field

Exemplary embodiments generally relate to manufacturing, and, more particularly, to a glass bending mold, a glass bending apparatus including the same, and a method of bending glass.

Discussion

The importance of a display device is gradually increasing with the development of multimedia. For example, application examples of display devices are diversifying according to portable electronic appliances, such as smart phones, smart watches, tablet personal computers, and the like. The value of a display device having a rounded display surface has increased. For example, the surface of a front cover glass forming the outer appearance of the display device may be partially rounded to improve the aesthetics of the display device and the grip feeling of a user. Further, an image may be displayed through the rounded surface of the front cover glass, and a touch surface on which a user's touch operation is performed may be formed by the rounded surface. Accordingly, there is a need to improve the accuracy of a glass bending process in which the cover glass is at least partly rounded.

The above information disclosed in this section is only for understanding the background of the inventive concepts, and, therefore, may contain information that does not form prior art.

SUMMARY

Some exemplary embodiments provide a glass bending apparatus capable of preventing deviation of a position of glass in a bending process. Preventing the deviation of the position of the glass in the bending process may be an influential factor affecting the accuracy of the glass bending process.

Some exemplary embodiments provide a glass bending mold capable of preventing deviation of a position of glass in a bending process. As previous noted, preventing the deviation of the position of the glass in the bending process may be an influential factor affecting the accuracy of the glass bending process.

Some exemplary embodiments provide a method of bending glass capable of preventing deviation of a position of the glass in the bending process. Again, preventing the deviation of the position of the glass in the bending process may be an influential factor affecting the accuracy of the glass bending process.

Additional aspects will be set forth in the detailed description which follows, and, in part, will be apparent from the disclosure, or may be learned by practice of the inventive concepts.

According to some exemplary embodiments, a glass bending apparatus configured to at least partially bend glass in a first direction includes a first mold and guide blocks. The first mold includes guide block insert holes. The guide blocks are respectively inserted into the guide block insert holes. The guide blocks are spaced apart from each other in a second direction intersecting the first direction.

In some exemplary embodiments, as part of a bending process, the guide blocks spaced apart from each other in the second direction may guide a position of the glass in the second direction to prevent deviation of a position of the glass.

In some exemplary embodiments, the first mold may include: a first glass supporting portion including a first flat surface; and a first bending forming portion disposed at a side of the first glass supporting portion in the first direction, the first bending formation portion including a first forming surface rounded in the first direction. The guide block insert holes may be disposed at sides of the first glass supporting portion, the sides of first glass supporting portion opposing one another in the second direction.

In some exemplary embodiments, the first mold may further include a first sidewall portion disposed at a side of the first bending forming portion in the first direction, the first sidewall portion being configured to guide a position of the glass in the first direction to prevent deviation of the position of the glass. The first forming surface of the first bending forming portion may include a downward inclination in a direction from the first glass supporting portion toward the first sidewall portion. A height formed by an upper surface of the first sidewall portion may be greater than a height formed by the first flat surface of the first glass supporting portion.

In some exemplary embodiments, the first sidewall portion of the first mold may be one of a plurality of first sidewall portions of the first mold, the plurality of first sidewall portions of the first mold may be spaced apart from each other. A distance between the guide blocks in the second direction may be greater than a distance between the plurality of first sidewall portions of the first mold in the first direction.

In some exemplary embodiments, a length in the second direction of the first bending forming portion including the first forming surface of the first mold may be greater than a distance in the second direction between the guide blocks.

In some exemplary embodiments, a side surface of the first sidewall portion of the first mold may be spaced apart from the first rounded forming surface of the first bending forming portion of the first mold. A valley may be formed by the side surface of the first sidewall portion and the first forming surface of the first bending forming portion. The valley may include a flat surface. A depth of the guide block insert hole may be greater than a height difference between the upper surface of the first sidewall portion and the flat surface of the valley.

In some exemplary embodiments, A thickness of the guide block may be greater than a depth of the guide block insert hole. A height formed by the upper surface of the guide block may be greater than a height formed by the first flat surface of the first glass supporting portion of the first mold in a state in which the guide block is inserted into the guide block insert hole of the first mold. The guide blocks may at least partially overlap the glass in the second direction.

In some exemplary embodiments, the guide blocks may be spaced apart from each other in the first direction and in the second direction. A shape of the glass may include a short side extending in the first direction and a long side extending in the second direction. A center of the short side of the glass may not overlap the guide block in the second direction. An edge of the short side of the glass may overlap the guide block in the second direction.

In some exemplary embodiments, the glass bending apparatus may further include a second mold overlapping the first mold, a first heat source, and a second heat source. The second mold may be configured to adjust a distance from the first mold. The first heat source may be spaced apart from the second mold with the first mold disposed therebetween. The first heat source may be configured to transfer heat through the first mold. The second heat source spaced may be apart from the first mold with the second mold disposed therebetween. The second heat source may be configured to transfer heat through the second mold.

In some exemplary embodiments, the second mold may include: a second glass supporting portion including a second flat surface and overlapping the first glass supporting portion; a second bending forming portion disposed at a side of the second glass supporting portion in the first direction and overlapping the first bending forming portion, the second bending forming portion including a second forming surface rounded in the first direction; and a sidewall inserting portion disposed at a side of the second bending forming portion in the first direction and overlapping the first sidewall portion of the first mold. A distance between the first glass supporting portion and the second glass supporting portion may be greater than a distance between the first sidewall portion and the sidewall inserting portion.

In some exemplary embodiments, the second mold may further include a second sidewall portion disposed at a side of the second bending forming portion in the first direction. In a state in which the guide block is inserted into the guide block insert hole of the first mold, the guide block and the second mold may be spaced apart from each other, a distance between the first glass supporting portion and the second glass supporting portion may be greater than a distance between the guide block and the second mold, and the second sidewall portion of the second mold may at least partially surround the first sidewall portion of the first mold in a plan view.

According to some exemplary embodiments, a glass bending mold configured to at least partially bend a glass in a first direction includes a glass supporting portion, a bending forming portion, and insert holes. The glass supporting portion includes a flat surface. The bending forming portion is disposed at a side of the glass supporting portion in the first direction. The bending forming portion includes a forming surface rounded in the first direction. The insert holes are disposed at sides of the glass supporting portion, the sides of the glass supporting portion opposing one another in a second direction intersecting the first direction.

In some exemplary embodiments, the insert holes may be spaced apart from each other in the first direction and in the second direction.

According to some exemplary embodiments, a method of bending a glass includes positioning a lower mold. The lower mold includes: a bending forming portion, the bending forming portion including a surface rounded in a first direction and guide block insert holes spaced apart from each other in a second direction intersecting the first direction; and guide blocks inserted into the guide block insert holes of the lower mold, the guide blocks being spaced apart from each other in the second direction. The method further includes: positioning an upper mold spaced apart from the lower mold; interposing a flat glass between the lower mold and the upper mold such that a position of the flat glass in the second direction is guided by the guide blocks spaced apart from each other in the second direction; and adjusting a relative position between the lower mold and the upper mold to form a bent glass, the flat glass being at least partially bent in the first direction to form the bent glass.

In some exemplary embodiments, forming the bent glass may include: the bent glass being in direct contact with the lower mold and the upper mold; and the guide blocks inserted into the guide block insert holes being spaced apart from the upper mold.

In some exemplary embodiments, interposing the flat glass between the lower mold and the upper mold may include the guide blocks spaced apart from each other guiding a position of the flat glass in the second direction to prevent deviation of a position of the flat glass.

In some exemplary embodiments, a thickness of the flat glass may be greater than a difference between a thickness of a guide block among the guide blocks and a depth of a guide block insert hole among the guide block insert holes.

In some exemplary embodiments, the method may further include heating the flat glass after interposing the flat glass between the lower mold and the upper mold and before forming the bent glass. Forming the bent glass may include decreasing a temperature of the glass interposed between the lower mold and the upper mold.

In some exemplary embodiments, the method may further include: preparing, before interposing the flat glass between the lower mold and the upper mold, a primary glass; and forming, before interposing the flat glass between the lower mold and the upper mold, at least one hole in the primary glass to form the flat glass comprising the at least one hole.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 9 is a cross-sectional view of the upper mold taken along sectional line IX-IX' in FIG. 8 according to some exemplary embodiments.

FIG. 11 is a plan view of a lower mold and a guide block of the glass bending apparatus in FIG. 10 according to some exemplary embodiments.

DETAILED DESCRIPTION OF THE ILLUSTRATED EMBODIMENTS

Figure 1:
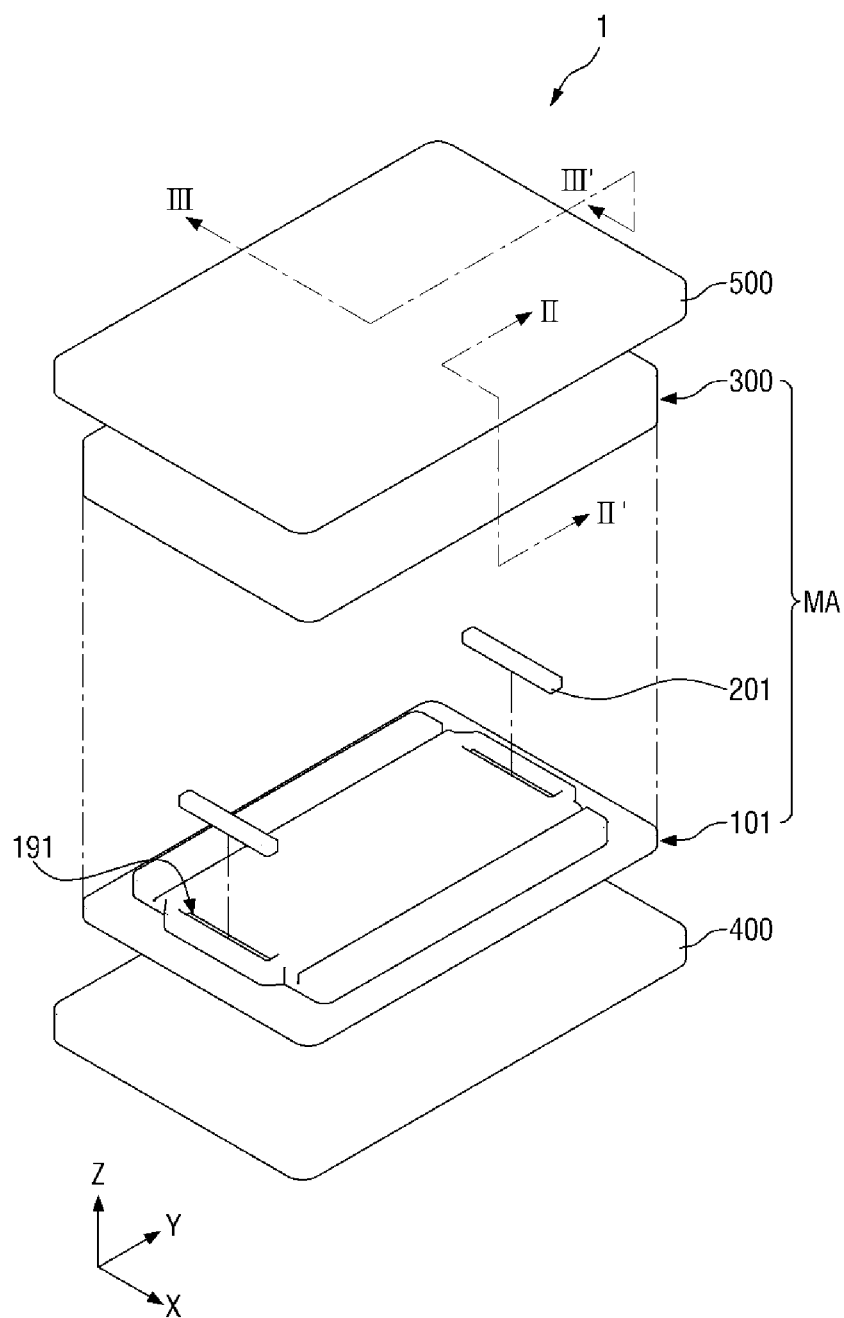
FIG. 1 is an exploded perspective view of a glass bending apparatus according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection.

For the purposes of this disclosure, the X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. To this end, a first direction X may be any one direction in a plane, a second direction Y may be a direction interesting the first direction X in the plane, and a third direction Z may be a direction perpendicular to the plane. Further, unless otherwise defined, the "plane" is a plane including the first direction X and the second direction Y.

The phrases "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items. To this end, the phrase "at least one" is not to be construed as limiting "a" or "an." Moreover, the term "or" is to be construed as "and/or." Further, although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "approximately," "about," and other similar terms, are used as terms of approximation and not as terms of degree, and, as such, are utilized to account for inherent deviations in measured, calculated, and/or provided values that would be recognized by one of ordinary skill in the art considering, for instance, the measurement in question and the error associated with the measurement of the particular quantity, e.g., such as associated with the limitations of the measurement system. For example, the term "about" can mean within one or more standard deviations, or within ±30%, 20%, 10%, or 5% of a stated value.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, various exemplary embodiments will be described with reference to the accompanying drawings.

Figure 2:
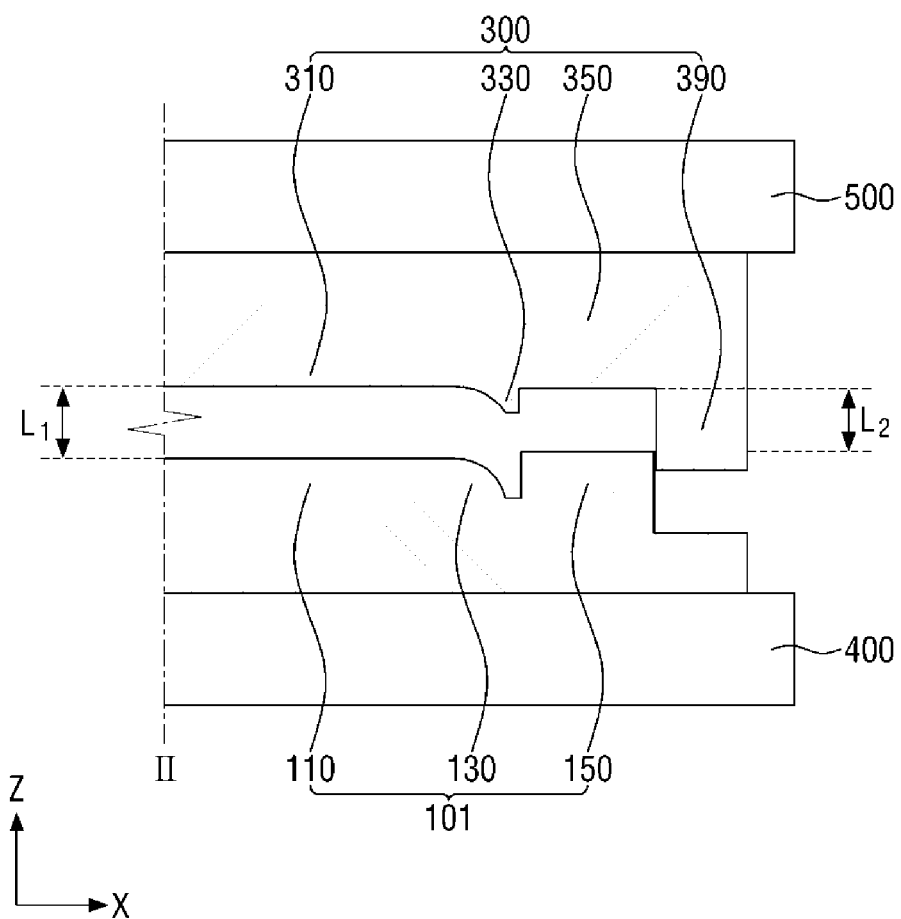
FIG. 2 is a cross-sectional view of the glass bending apparatus taken along sectional line II-II' in FIG. 1 according to some exemplary embodiments.
Figure 3:
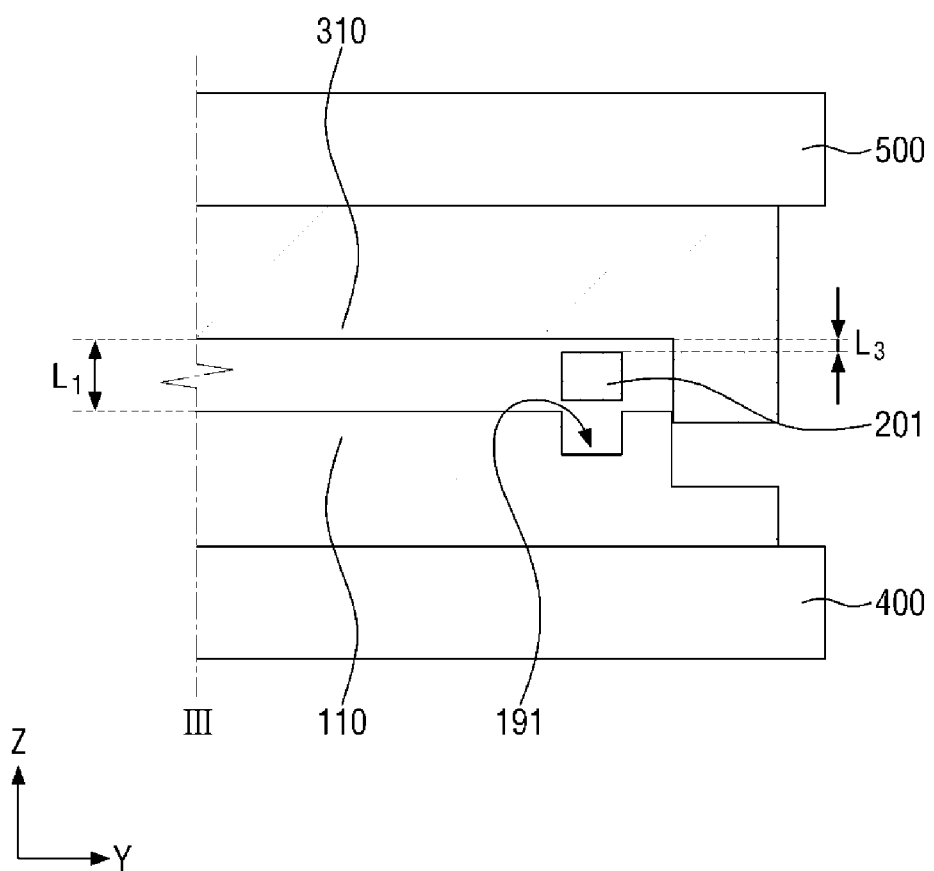
FIG. 3 is a cross-sectional view of the glass bending apparatus taken along sectional line III-III' in FIG. 1 according to some exemplary embodiments.

FIG. 1 is an exploded perspective view of a glass bending apparatus 1 according some exemplary embodiments. FIG. 2 is a cross-sectional view of the glass bending apparatus 1 taken along sectional line II-II' in FIG. 1 according some exemplary embodiments. FIG. 3 is a cross-sectional view of the glass bending apparatus 1 taken along sectional line III-III' in FIG. 1 according some exemplary embodiments.

Referring to FIGS. 1 to 3, the glass bending apparatus 1 according to some exemplary embodiments includes a mold assembly MA including a lower mold 101 (for example, a first mold), an upper mold 300 (for example, a second mold), and a guide block 201. The glass bending apparatus 1 may further include a lower heat source 400 (for example, a first heat source) and an upper heat source 500 (for example, a second heat source). The glass bending apparatus 1 may be a glass bending apparatus for at least partially bending and forming an object to be bent (hereinafter, referred to as a "bending object"), for example, a glass (not shown) in the first direction X.

In some exemplary embodiments, the lower mold 101 may have a guide block insert hole 191 into which the guide block 201 is inserted. For convenience of illustration and explanation, although FIGS. 1 and 3 show a state where the lower mold 101, the guide block 201, and the upper mold 300 are spaced apart from each other, the guide block 201 may be inserted into the guide block insert hole 191 of the lower mold 101.

The front surface of the lower mold 101 facing the upper mold 300 may form a lower mold surface, and the back surface of the upper mold 300 facing the lower mold 101 may form an upper mold surface. Although not shown in the drawing, a bending object, for example, a glass may be formed by the lower mold surface and the upper mold surface. That is, each of the lower mold 101 and the upper mold 300 may be a mold member for bending a glass.

The lower heat source 400 may be disposed to be spaced apart from the upper mold 300 with the lower mold 101 therebetween. The lower heat source 400 may be configured to transfer heat to the upper mold 300 through the lower mold 101. For example, the lower heat source 400 may be a heating plate attached closely to the back surface of the lower mold 101.

Further, the upper heat source 500 may be disposed to be spaced apart from the lower mold 101 with the upper mold 300 therebetween. The upper heat source 500 may be configured to transfer heat to the lower mold 101 through the upper mold 300. For example, the upper heat source 500 may be a heating plate attached closely to the front surface of the upper mold 300.

Hereinafter, the lower mold 101 and the guide block 201 of the glass bending apparatus 1 will be described in more detail with further reference to FIGS. 4 to 7.

Figure 4:
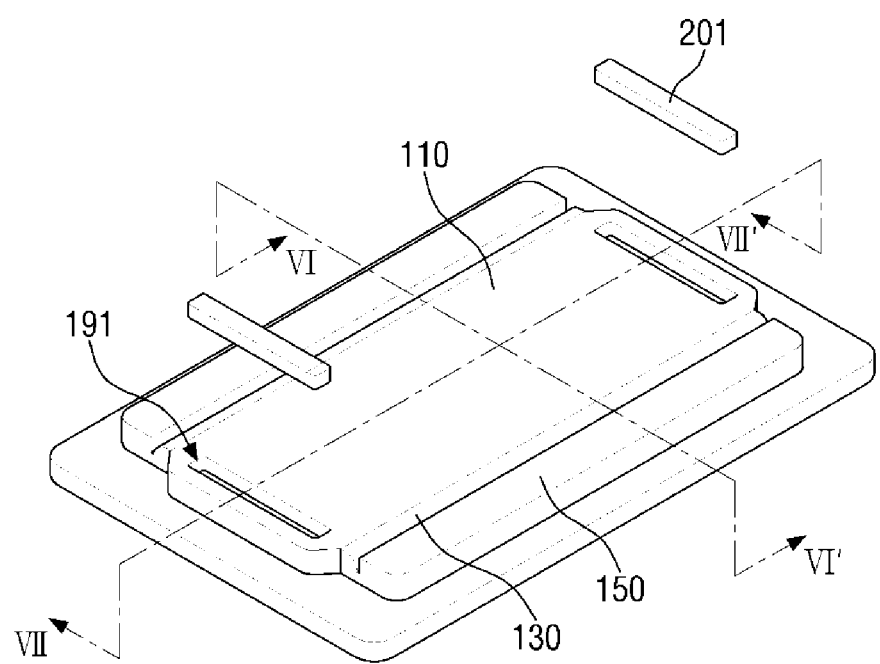
FIG. 4 is an exploded perspective view of a lower mold and a guide block of the glass bending apparatus in FIG. 1 according to some exemplary embodiments.
Figure 5:
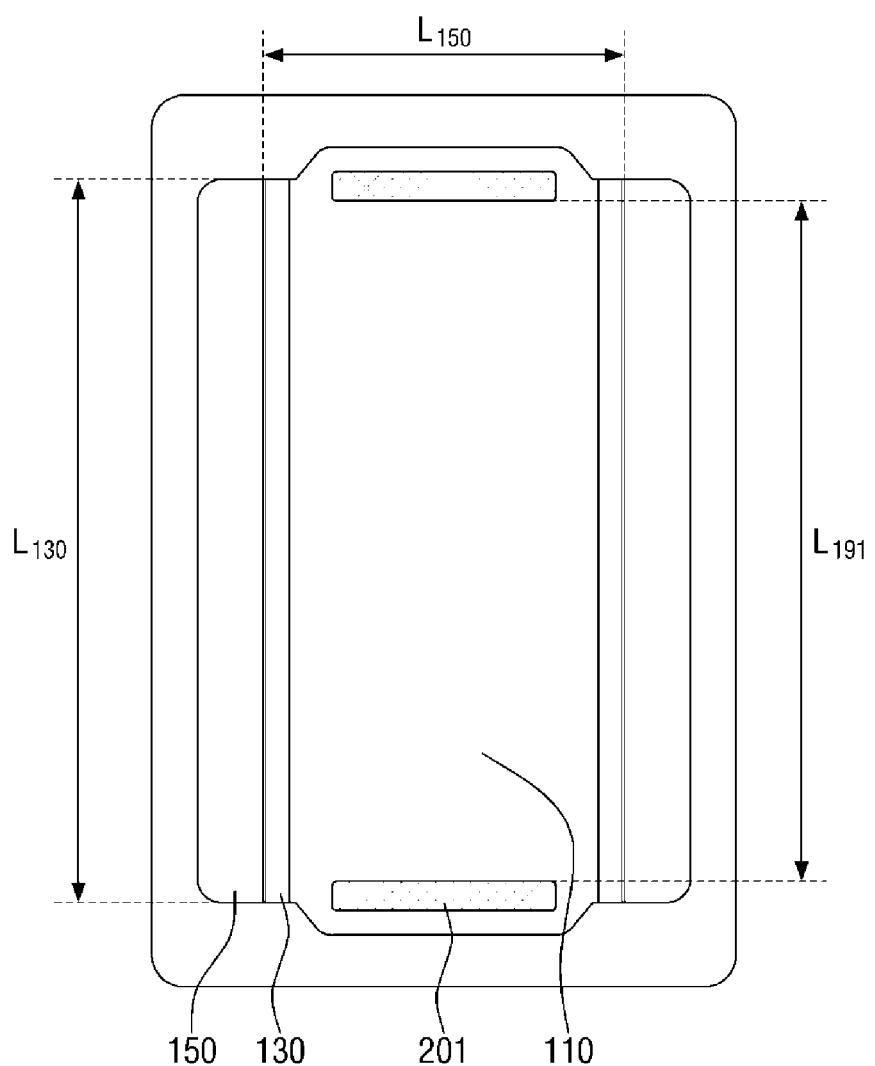
FIG. 5 is a plan view of the lower mold and the guide block in FIG. 4 according to some exemplary embodiments.
Figure 6:
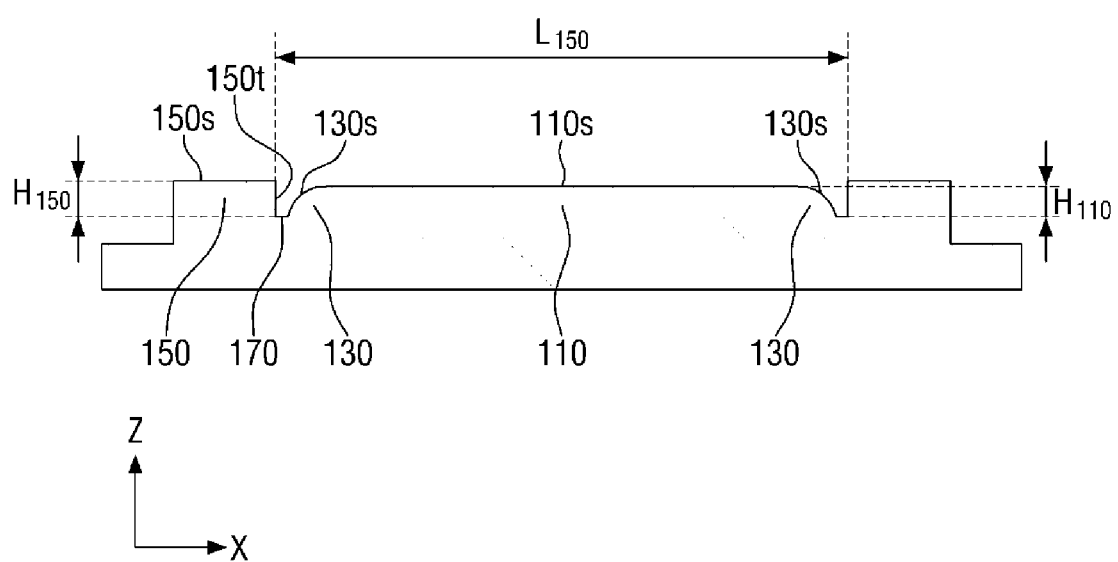
FIG. 6 is a cross-sectional view of the lower mold taken along sectional line VI-VI' in FIG. 4 according to some exemplary embodiments.
Figure 7:
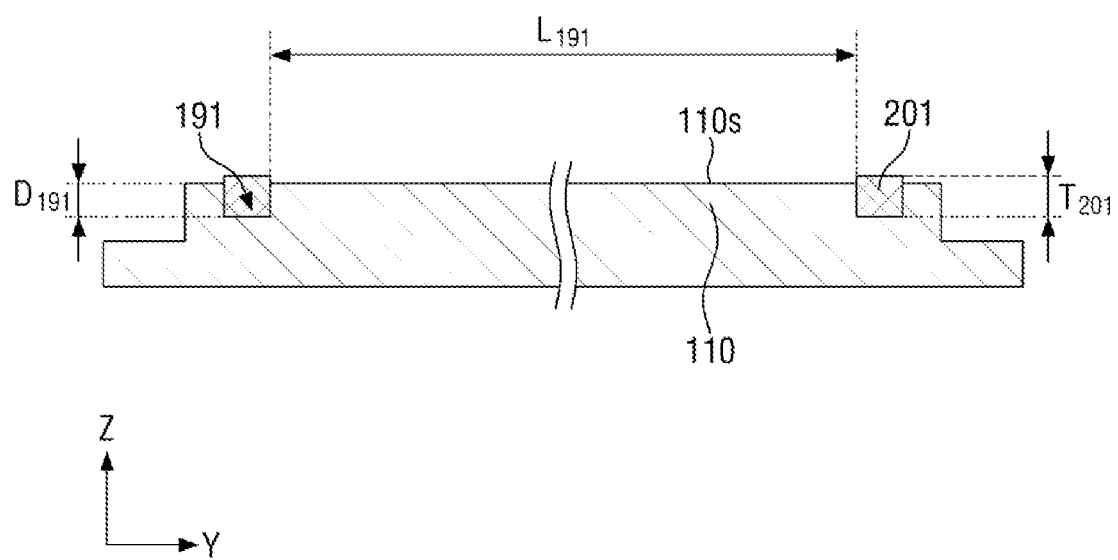
FIG. 7 is a cross-sectional view of the lower mold and the guide block taken along sectional line VII-VII' in FIG. 4 according to some exemplary embodiments.

FIG. 4 is an exploded perspective view of the lower mold 101 and the guide block 201 in FIG. 1 according some exemplary embodiments. FIG. 5 is a plan view of the lower mold 101 and the guide block 201 in FIG. 4 according some exemplary embodiments. FIG. 6 is a cross-sectional view of the lower mold taken along sectional line VI-VI' in FIG. 4 according some exemplary embodiments. It is noted that the lower mold 101 in FIG. 6 is cut along the first direction X. FIG. 7 is a cross-sectional view of the lower mold 101 and the guide block 201 taken along sectional line VII-VII' in FIG. 4 according some exemplary embodiments. It is noted that the lower mold 101 and the guide block 201 of FIG. 7 are cut along the second direction Y.

Further referring to FIGS. 4 to 7, the guide block 201 is disposed on the lower mold surface (front surface in FIG. 3) of the lower mold 101, and may be at least partially inserted into the guide block insert hole 191. That is, the guide block 201 may be located between two inner sidewalls of the guide block insert hole 191 that face each other in a state where the lower mold 101 and the guide block 201 are coupled with each other.

The lower mold 101 may include a material having excellent rigidity and strength and having excellent thermal conductivity. For example, the lower mold may include a graphite material or the like, but exemplary embodiments are not limited thereto.

The lower mold 101 may form a lower mold surface to be at least partially attached closely to a bending object, for example, a glass (not shown) during a bending process. In some exemplary embodiments, the lower mold 101 may include a lower glass supporting portion 110 and a lower bending forming portion 130, and may further include a lower sidewall portion 150. As a non-limiting example, the lower glass supporting portion 110, the lower bending forming portion 130, and the lower sidewall portion 150 may be sequentially located along the first direction X.

The lower glass supporting portion 110 (for example, first glass supporting portion) may have a lower flat surface 110s (for example, first flat surface) that is substantially flat. During a bending process, the lower glass supporting portion 110 may stably support and fix a bending object from the lower side without substantially causing deformation of the bending object.

The lower bending forming portion 130 (for example, first bending forming portion) may have a lower forming surface 130s (for example, first forming surface) rounded in the first direction X. For example, the lower forming surface 130s of the lower bending forming portion 130 may have a downward inclination in a direction from the lower glass supporting portion 110 toward the lower sidewall portion 150 to be described later. The lower bending forming portion 130 may be located at one side of the lower glass supporting portion 110 in the first direction X, and may be integrally formed without physical boundary. The lower bending forming portion 130 having the lower forming surface 130*s* rounded in the first direction X may have a shape extending in the second direction Y.

The lower bending forming portion 130 may be a portion causing the shape deformation of the bending object during the bending process. That is, the back surface of the bending object may be bent in a shape corresponding to the lower forming surface 130*s* of the lower bending forming portion 130.

Although FIG. 5 and the like illustrate a case where a plurality of lower bending forming portions 130 are located at one side and the other side of the lower glass supporting portion 110 in the first direction X and are approximately symmetrical to each other, exemplary embodiments are not limited thereto.

The lower sidewall portion 150 (for example, first sidewall portion) may be located at one side of the lower bending forming portion 130 in the first direction X. The lower sidewall portion 150 may be integrally formed with the lower bending forming portion 130 without physical boundary. As described above, the lower bending forming portion 130 may have a downward inclination toward the lower sidewall portion 150, and the lower sidewall portion 150 may protrude from the lowest level of the lower bending forming portion 130.

The lower sidewall portion 150 and the lower bending forming portion 130 may together form a valley 170. The valley 170 may refer to the lowest level of the lower bending forming portion 130. In some exemplary embodiments, the lower sidewall portion 150 and the lower bending forming portion 130 may be spaced apart from each other. For example, the side surface 150*t* of the lower sidewall portion 150 and the lower forming surface 130*s* of the lower bending forming portion 130 may be spaced apart from each other in the first direction X, and the valley 170 therebetween may have an approximately flat surface. During the bending process, the valley 170 having a flat surface may secure a process margin, thereby preventing the bending object after bending from being damaged by the lower sidewall portion 150.

In some exemplary embodiments, the level of the upper surface 150*s* of the lower sidewall portion 150 may be different from the level of the lower flat surface 110*s* of the lower glass supporting portion 110. For example, the height $H_{150}$ formed by the upper surface 150*s* of the lower sidewall portion 150 may be greater than the height $H_{110}$ formed by the lower flat surface 110*s* of the lower glass supporting portion 110. Specifically, the height difference $H_{150}$ between the upper surface 150*s* of the lower sidewall portion 150 and the valley 170 may be greater than the height difference $H_{110}$ between the lower flat surface 110*s* of the lower glass supporting portion 110 and the valley 170. The level of the upper surface 150*s* of the lower sidewall portion 150 is set to be higher than the level of the lower flat surface 110*s* of the lower glass supporting portion 110 so that the lower sidewall portion 150 can be used to prevent the deviation of position of the bending object. For example, the lower sidewall portion 150 may guide the position of the bending object in the first direction X, thereby preventing the deviation of the position of the bending object. That is, during a bending process, the lower sidewall portion 150 may be disposed to at least partially overlap a bending object (not shown) in the first direction X.

Although FIG. 5 and the like illustrate a case where a plurality of lower sidewall portions 150 are located at one side and the other side of the lower glass supporting portion 110 in the first direction X and are approximately symmetrical to each other, exemplary embodiments are not limited thereto.

The plurality of guide block insert holes 191 of the lower mold 101 may be located at one side and the other side of the lower glass supporting portion 110 in the second direction Y. The plurality of guide blocks 201 inserted into the guide block insert holes 191 may be spaced apart from each other in the second direction Y. The guide block 201 according to some exemplary embodiments may have a shape where the length in the first direction X is longer than the width in the second direction Y.

The guide block 201 inserted into the guide block insert hole 191 of the lower mold 101 may be configured to prevent the deviation of the position of the bending object by guiding the position of the bending object in the second direction Y. That is, during a bending process, the guide block 201 may be disposed to at least partially overlap a bending object (not shown) in the second direction Y.

In some exemplary embodiments, the distance $L_{191}$ between the guide block insert holes 191 in the second direction Y may be greater than the distance $L_{150}$ between the lower sidewall portions 150 in the first direction X. That is, the distance between the guide blocks 201 in the second direction Y may be greater than the distance $L_{150}$ between the lower sidewall portions 150 in the first direction X. As described above, the lower sidewall portion 150 of the lower mold 101 may guide the position of the bending object in the first direction X, and the guide block 201 inserted into the guide block insert hole 191 may guide the position of the bending object in the second direction Y. In this case, a bending object (not shown) may have a shape having a short side in the first direction X and a long side in the second direction Y.

Although not shown, when bending a glass having a short side in the first direction X and a long side in the second direction Y using the glass bending apparatus 1 according to some exemplary embodiments, the guide block 201 may be disposed to overlap the center position of the short side of the glass, but exemplary embodiments are not limited thereto.

The guide block 201 may include the same material as the lower mold 101 or a different material from the lower mold 101. The guide block 201 is inserted into the guide block insert hole 191 of the lower mold 101, but may be inserted reversibly detachably, or may be inserted irreversibly to be attached to each other. In this case, the distance $L_{191}$ between the plurality of guide block insert holes 191 in the second direction Y may be substantially equal to the distance between the plurality of guide blocks 201 in the second direction Y.

The level of the upper surface of the guide block 201 may be different from the level of the lower flat surface 110*s* of the lower glass supporting portion 110. For example, the height formed by the upper surface of the guide block 201 may be greater than the height formed by the lower flat surface 110*s* of the lower glass supporting portion 110 in a state where the guide block 201 is completely inserted into the guide block insert hole 191. More specifically, the thickness $T_{201}$ of the guide block 201 may be greater than the depth $D_{191}$ of the guide block insert hole 191.

The position accuracy of the bending object can be improved by inserting the guide block 201 guiding the position of the bending object in the second direction Y into the lower mold 101 in the bending process. Particularly, the lower mold 101 and the guide block 201 may be manufactured separately and assembled to form the mold assembly MA so that the shapes of the lower mold 101 and the guide block 201 can be formed more precisely. As a non-limiting example, the lower flat surface 110s of the lower glass supporting portion 110 of the lower mold 101 may be substantially perpendicular to the side surface of the guide block 201. That is, even when the lower mold 101 includes a material difficult to be micro-processed, the lower forming surface of the lower mold 101 and the side surface of the guide block 201 may be formed to be substantially perpendicular to each other. For example, when a fine component guiding the position of a bending object has a side surface forming a determined inclination, the bending object cannot be completely guided by the side surface of the guiding component, and a process error may occur, such as climbing on an inclined side surface. The mold assembly MA including the lower mold 101 and the guide block 201 according to some exemplary embodiments has an effect capable of minimizing such a process error.

In some exemplary embodiments, the length L130 of the lower bending forming portion 130 in the second direction Y may be greater than the distance $L_{191}$ between the plurality of guide block insert holes 191 in the second direction Y; that is, the distance between the guide blocks 201 in the second direction Y. As described above, when the bending of the bending object is performed using the glass bending apparatus 1 according to some exemplary embodiments, the length of a bending object (not shown) in the second direction Y may approximately correspond to the distance $L_{191}$ between the guide block insert holes 191 in the second direction Y. When the length $L_{130}$ of the lower bending forming portion 130 in the second direction Y is made greater than the length of the bending object in the second direction Y, a process margin can be secured in the bending process, and an intended bending forming can be performed even when the bending object deviates from a determined position.

Further, the depth $D_{191}$ of the guide block insert hole 191 may be greater than the height difference $H_{150}$ between the upper surface 150s of the lower sidewall portion 150 and the surface of the valley 170. That is, the depth $D_{191}$ of the guide block insert hole 191 may be greater than the protruding height $H_{150}$ of the lower sidewall portion 150. During a bending process, a bending object (not shown) may be strongly attached to the lower mold 101 and the upper mold 300, and the bending object to be bent may receive a force in a horizontal direction, for example, a force in the first direction X or the second direction Y. The force in the horizontal direction may cause deviation of the position of the bending object. In this case, the depth $D_{191}$ of the guide block insert hole 191 into which the guide block 201 is inserted can be sufficiently secured, and the guide block 201 can firmly support the bending object during the attaching process.

Hereinafter, the upper mold 300 of the glass bending apparatus 1 will be described in more detail with further reference to FIGS. 8 and 9.

Figure 8:
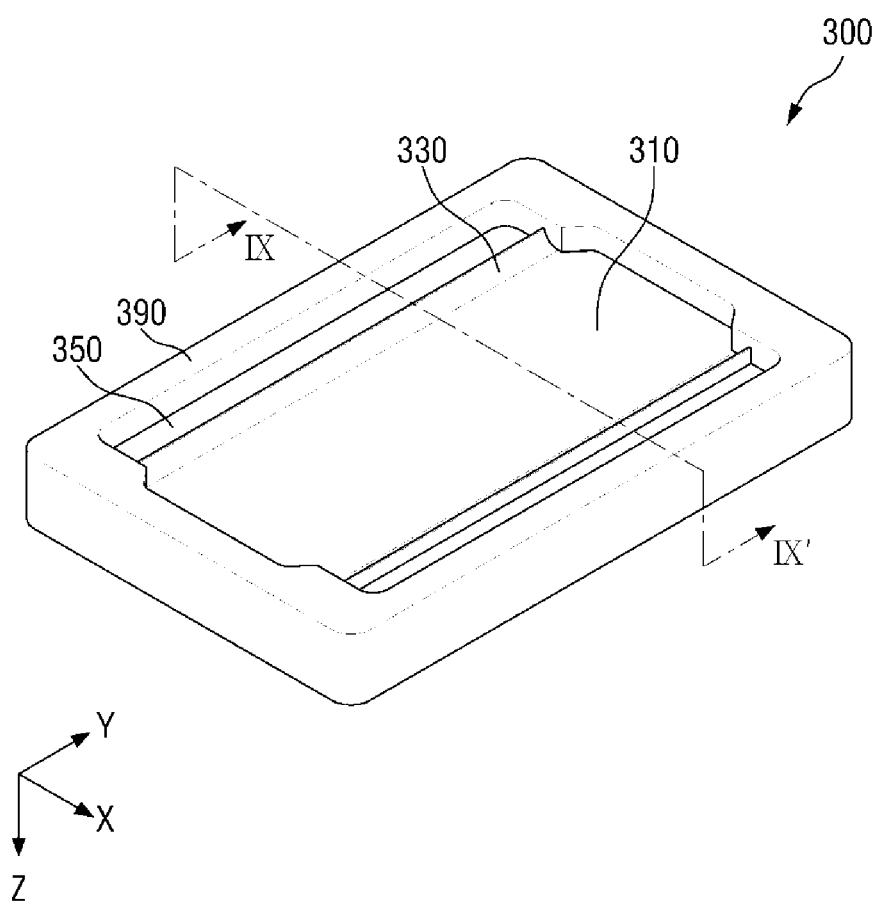
FIG. 8 is a rear perspective view of an upper mold of the glass bending apparatus in FIG. 1 according to some exemplary embodiments.

FIG. 8 is a rear perspective view of the upper mold 300 of FIG. 1 according some exemplary embodiments. FIG. 9 is a cross-sectional view of the upper mold 300 taken along sectional line IX-IX' in FIG. 8 according some exemplary embodiments. It is noted that the upper mold 300 in FIG. 9 is cut along the first direction X.

Further referring to FIGS. 8 and 9, the upper mold 300 may be disposed to face the lower mold 101 in the third direction Z in an overlapping manner. The upper mold 300 may be configured to be capable of adjusting the distance from the lower mold 101. For example, when the position of the lower mold 101 is fixed, the upper mold 300 may be configured to be moved up and down by an elevating unit (not shown).

The upper mold 300, similarly to the lower mold 101, may include a material having excellent rigidity and strength and having excellent thermal conductivity. For example, the upper mold 300 may include a graphite material or the like. The material of the upper mold 300 may be the same as or different from that of the lower mold 101.

The upper mold 300 may form an upper mold surface to be at least partially attached closely to a bending object, for example, a glass (not shown) during a bending process. In some exemplary embodiments, the upper mold 300 may include an upper glass supporting portion 310 and an upper bending forming portion 330, and may further include a sidewall inserting portion 350 and an upper sidewall portion 390. As a non-limiting example, the upper glass supporting portion 310, the upper bending forming portion 330, the sidewall inserting portion 350, and the upper sidewall portion 390 may be sequentially located along the first direction X.

The upper glass supporting portion 310 (for example, second glass supporting portion) may have an upper flat surface 310s (for example, second flat surface) that is substantially flat. The upper glass supporting portion 310 may substantially overlap the lower glass supporting portion 110 in the third direction Z in a state where the lower mold 101 and the upper mold 300 are coupled with each other. During a bending process, the upper glass supporting portion 310 may be attached closely to a bending object to stably support and fix the bending object together with the lower glass supporting portion 110 without substantially causing deformation of the bending object.

The upper bending forming portion 330 (for example, second bending forming portion) may have an upper forming surface 330s (for example, second forming surface) rounded in the first direction X. For example, the upper forming surface 330s of the upper bending forming portion 330 may have an upward inclination in a direction from the upper glass supporting portion 310 toward the sidewall inserting portion 350 to be described later (refer to rear perspective view of FIG. 8). The upper bending forming portion 330 may be located at one side of the upper glass supporting portion 310 in the first direction X, and may be integrally formed without physical boundary. The upper bending forming portion 330 having the upper forming surface 330s rounded in the first direction X may have a shape extending in the second direction Y.

The upper bending forming portion 330 may be a portion causing the shape deformation of the bending object during a bending process. That is, the front surface of the bending object may be bent in a shape corresponding to the upper forming surface 330s of the upper bending forming portion 330. The upper bending forming part 330 may substantially overlap the lower bending forming part 130 in the third direction Z in a state where the lower mold 101 and the upper mold 300 are coupled with each other. Further, the upper bending forming portion 330 may have a shape substantially corresponding to the lower bending forming portion 130, but exemplary embodiments are not limited thereto.

The sidewall inserting portion 350 may be a portion into which the above-described lower sidewall portion 150 is inserted. That is, the sidewall inserting portion 350 may substantially overlap the lower sidewall portion 150 in the third direction Z in a state where the lower mold 101 and the upper mold 300 are coupled with each other. For convenience of illustration and explanation, although FIGS. 2 and 3 show a state where the lower mold 101 and the upper mold 300 are spaced apart from each other, the lower sidewall portion 150 of the lower mold 101 may be located between the upper bending forming portion 330 and upper sidewall portion 390 of the upper mold 300 in a state where the lower mold 101 and the upper mold 300 are coupled with each other.

The sidewall inserting portion 350 may have a substantially flat surface 350s (for example, a third flat surface). The level of the upper flat surface 310s of the upper glass supporting portion 310 of the upper mold 300 may be different from the level of the flat surface 350s of the sidewall inserting portion 350. The sidewall inserting portion 350 is located at one side of the upper bending forming portion 330 in the first direction X, and may be integrally formed without physical boundary.

The upper sidewall portion 390 (for example, second sidewall portion) may be located at one side of the sidewall inserting portion 350 in the first direction X. The upper sidewall portion 390 may be integrally formed with the sidewall inserting portion 350 without physical boundary. The upper sidewall portion 390 may have a shape protruding from the upper flat surface 310s of the upper glass supporting portion 310 and the surface 350s of the sidewall inserting portion 350. That is, the upper mold 300 may have an inner space surrounded by the upper sidewall portion 390. The above-described lower glass supporting portion 110, the lower bending forming portion 130 and the lower sidewall portion 150 of the lower mold 101 may be at least partially inserted into the inner space in a state where the upper mold 300 and the lower mold 101 are coupled with each other. As a non-limiting example, the upper sidewall portion 390 may at least partially surround the lower sidewall portion 150 in a state where the upper mold 300 and the lower mold 101 are coupled with each other.

In some exemplary embodiments, in a state where the upper mold 300 and the lower mold 101 are coupled with each other, the distance $L_1$ between the lower glass supporting portion 110 of the lower mold 101 and the upper glass supporting portion 310 of the upper mold 300 may be greater than the distance $L_2$ between the lower sidewall portion 150 of the lower mold 101 and the sidewall inserting portion 350 of the upper mold 300. That is, the vertical shortest distance $L_1$ between the lower flat surface 110s and the upper flat surface 310s may be greater than the shortest vertical distance $L_2$ between the upper surface 150s of the lower sidewall portion 150 and the surface 350s of the sidewall inserting portion 350.

When a bending object (not shown) having a determined thickness is interposed between the lower glass supporting portion 110 and the upper glass supporting portion 310 and between the lower bending forming portion 130 and the upper bending forming portion 330 to allow the bending object to be attached closely to the lower mold 101 and the upper mold 300, the lower sidewall portion 150 inserted into the sidewall inserting portion 350 can function as a tight stopper. In this case, the distance L2 between the lower sidewall portion 150 and the sidewall inserting portion 350 may be substantially zero in a state where the lower mold 101 and the upper mold 300 are coupled with each other. Thus, it is possible to prevent the bending object from being damaged. For convenience of explanation, although FIGS. 2 and 3 show a state where the lower mold 101 and the upper mold 300 are spaced apart from each other, the lower mold 101 and the upper mold 300 may be coupled with each other, and the lower sidewall portion 150 and the sidewall inserting portion 350 may be attached closely to each other.

Further, when the guide block 201 is inserted into the guide block insert hole 191 of the lower mold 101 and the lower mold 101 and the upper mold 300 are coupled with each other, the guide block 201 may be spaced apart from the upper mold 300 without being in contact with the upper mold 300. Further, the distance $L_1$ between the lower glass supporting portion 110 of the lower mold 101 and the upper glass supporting portion 310 of the upper mold 300 may be greater than the distance $L_3$ between the guide block 201 and the upper mold 300. As described above, the level formed by the upper surface of the guide block 201 may be higher than the level formed by the lower flat surface 110s, and the distance $L_3$ between the guide block 201 and the upper mold 300 may be smaller than the distance $L_1$ between the lower flat surface 110s and the upper flat surface 310s in a state where the lower mold 101 and the upper mold 300 are in closest contact with each other.

Hereinafter, another glass bending apparatus according to some exemplary embodiments will be described. However, the description of the same or substantially the same configuration as the glass bending apparatus 1 shown in FIG. 1 or the like will be omitted.

Figure 10:
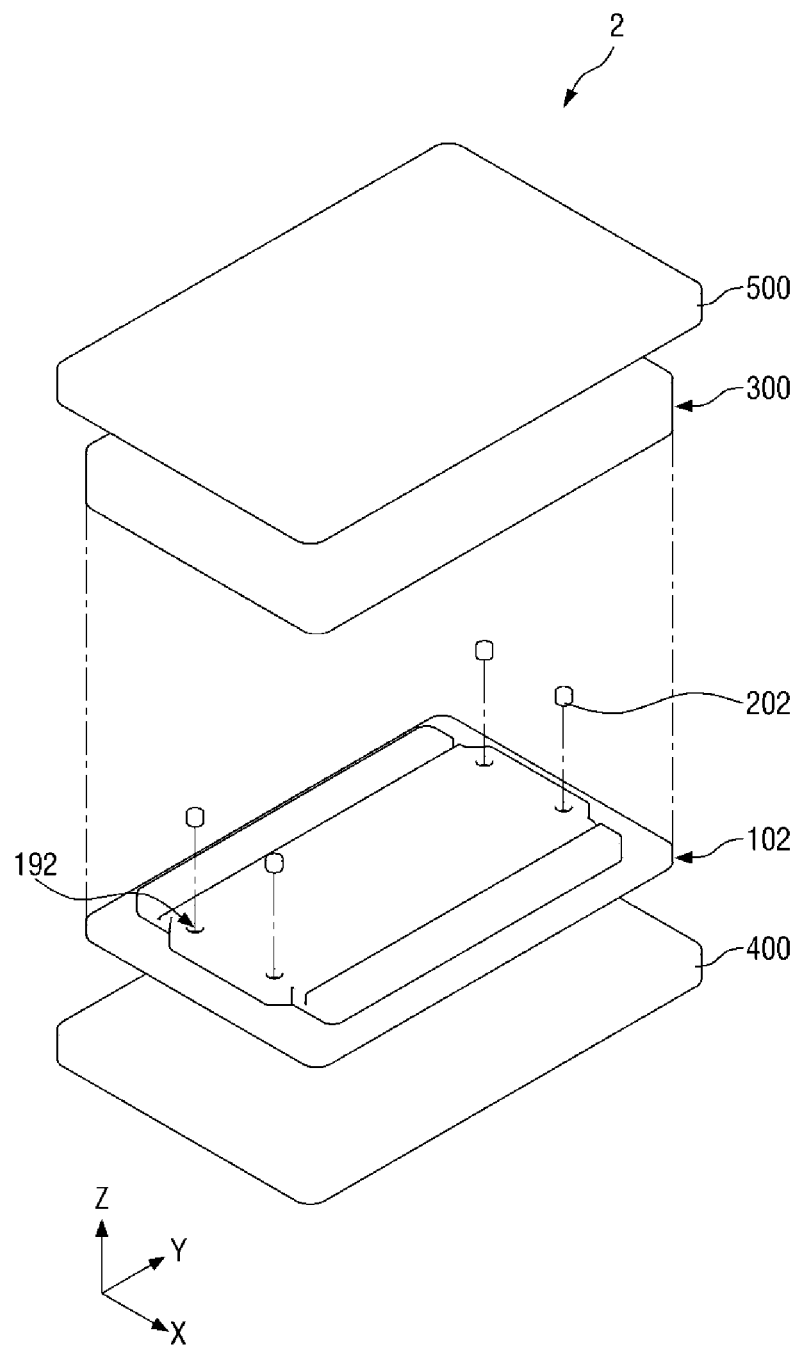
FIG. 10 is an exploded perspective view of a glass bending apparatus according to some exemplary embodiments.

FIG. 10 is an exploded perspective view of a glass bending apparatus 2 according some exemplary embodiments. FIG. 11 is a plan view of the lower mold 102 and the guide block 202 of FIG. 10 according some exemplary embodiments.

Referring to FIGS. 10 and 11, the glass bending apparatus 2 according to some exemplary embodiments is different from the glass bending apparatus 1 of FIG. 1 or the like, in that a plurality of guide block insert holes 192 of a lower mold 102 and a plurality of guide blocks 202 are spaced apart from each other in the first direction X as well as the second direction Y, respectively. In some exemplary embodiments, the guide blocks 202 may be located adjacent to the corners of a bending object, for instance, a glass (not shown).

That is, although the guide blocks 202 are the same as the guide blocks 201 of FIG. 1 or the like in that they are disposed to overlap the bending object (not shown) during a bending process, when bending a glass having a short side in the first direction X and a long side in the second direction Y by using the glass bending apparatus 2, each of the guide blocks 202 may be disposed so as not to overlap the center position (or portion) of the short side of the glass. Each of the guide blocks 202 may be disposed to overlap the edge of the short side in the second direction Y.

Although the exemplary embodiments are not limited thereto, when the guide blocks 202 and the lower mold 102 are separately manufactured and assembled into a mold assembly, heat emitted from the lower heat source 400 and/or the upper heat source 500 may concentrate in the vicinity of the guide blocks 202. As such, the guide blocks 202 are located at one side of the bending object in the second direction Y, but the plurality of guide blocks 202 spaced apart from each other in the first direction X are formed without extending in the first direction X, thereby minimizing the concentration of heat at the center of the bending object.

Further, although exemplary embodiments are not limited thereto, when the bending object has a substantially rectangular shape, a heat transfer amount in the vicinity of each corner of the bending object may be relatively small as compared with the vicinity of the center (or central portion) of the bending object, and defects not completely bending the vicinity of each corner of the bending object, for instance, edge-lifted defects, may occur. As such, when the guide blocks 202 are located in the vicinity of corners of the bending object to be spaced apart from each other in the first direction X and the second direction Y, concentration of heat to the vicinity of the corners can be induced to minimize the defect that the vicinity of the corners is not completely bent.

As described above, the distance $L_{192}$ between the guide block insert holes 192 in the second direction Y may be greater than the distance $L_{150}$ between the lower sidewall portions 150 in the first direction X.

Although FIG. 10 illustrates a case where a total of four guide blocks 202 with two guide blocks 202 in the first direction X and two guide blocks 202 in the second direction Y are arranged, exemplary embodiments are not limited thereto.

Since the lower glass supporting portion 110, lower bending forming portion 130 and lower sidewall portion 150 of the lower mold 102, the upper mold 300, the lower heat source 400, the upper heat source 500, and the like have been described with reference to FIG. 1 or the like, redundant descriptions will be omitted.

Hereinafter, a method of bending a glass according to some exemplary embodiments will be described.

Figure 12:
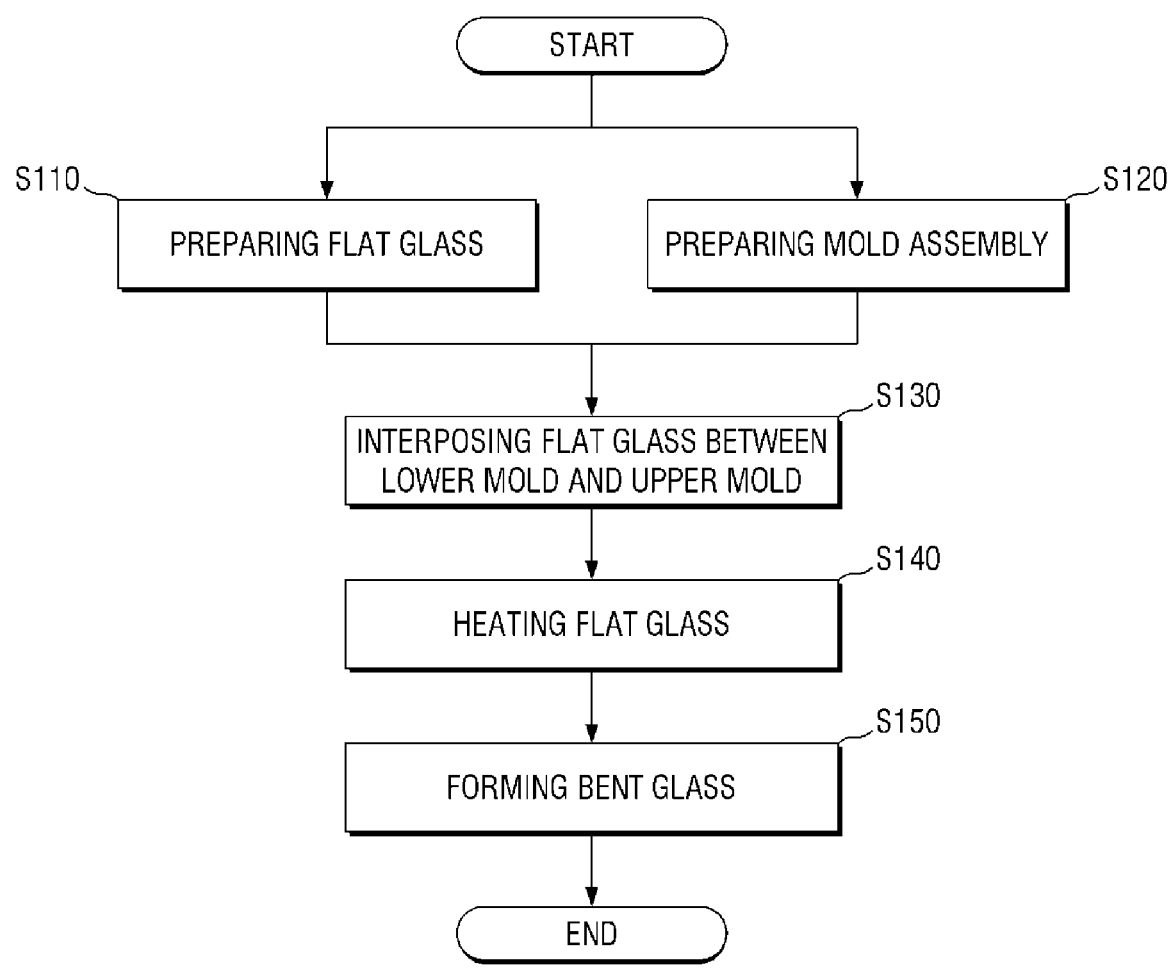
FIG. 12 is a flowchart illustrating a method of bending glass according to some exemplary embodiments.

FIG. 12 is a flowchart illustrating a method of bending glass according some exemplary embodiments.

Referring to FIG. 12, the method of bending a glass according to some exemplary embodiments may include the steps of: preparing a flat glass (step S110); preparing a mold assembly (step S120); interposing the flat glass between a lower mold and an upper mold (step S130); heating the flat glass (step S140); and forming a bent glass (step S150).

Hereinafter, the method of bending a glass according to some exemplary embodiments will be descried in more detail with further reference to FIGS. 13 to 19.

Figure 13:
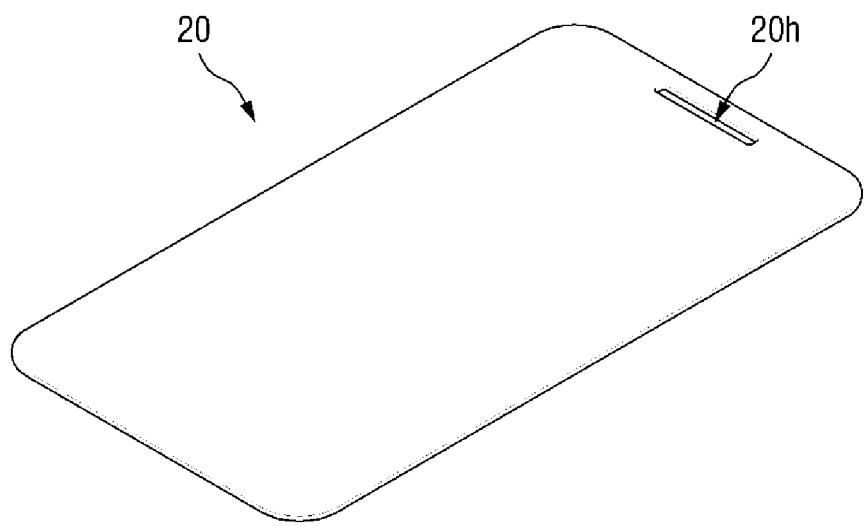
FIG. 13 is a view illustrating a step of preparing flat glass in FIG. 12 according to some exemplary embodiments.
Figure 14:
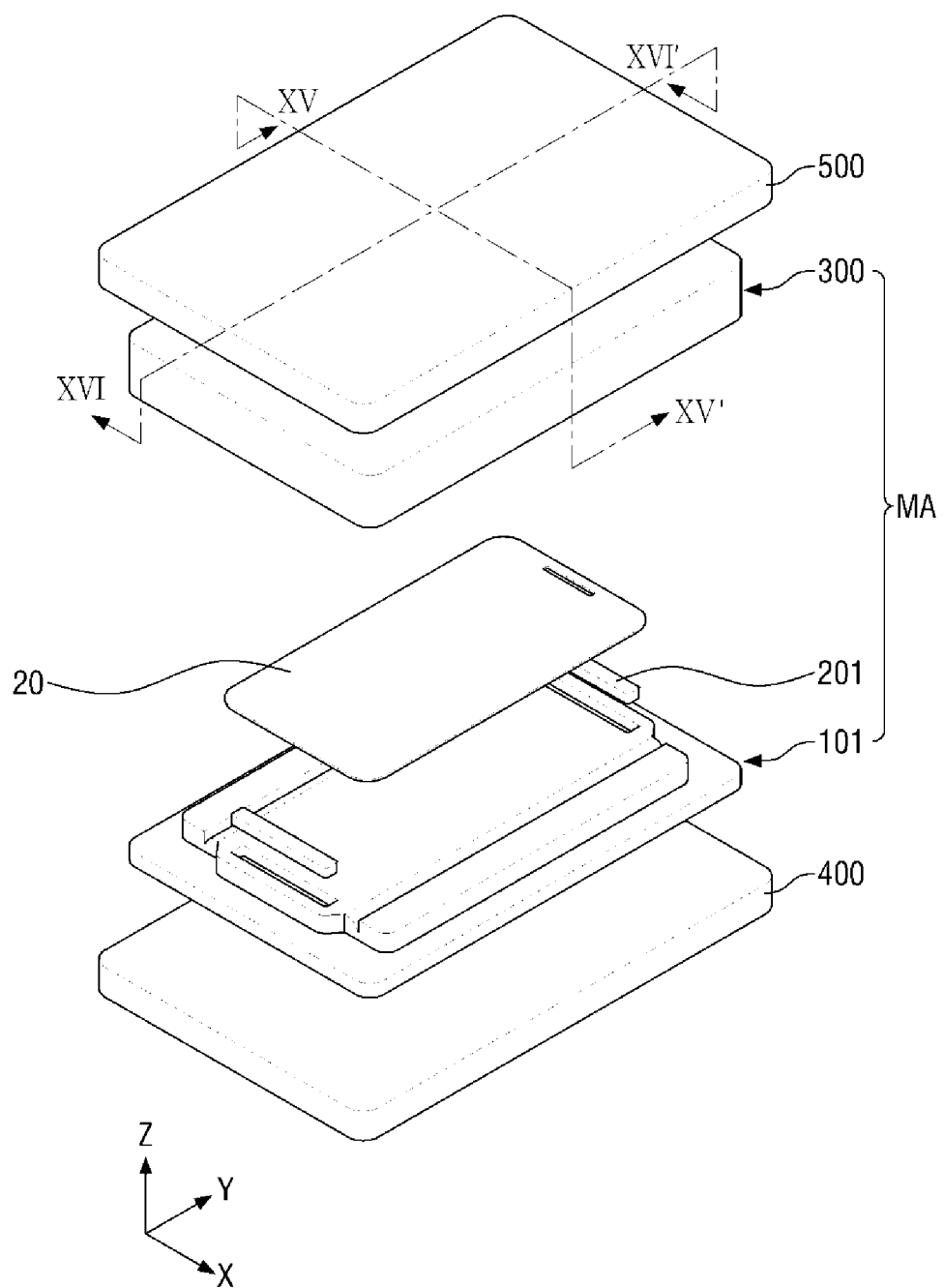
FIGS. 14, 15, and 16 are views illustrating a step of interposing the flat glass and heating of the flat glass in FIG. 12 according to some exemplary embodiments.
Figure 15:
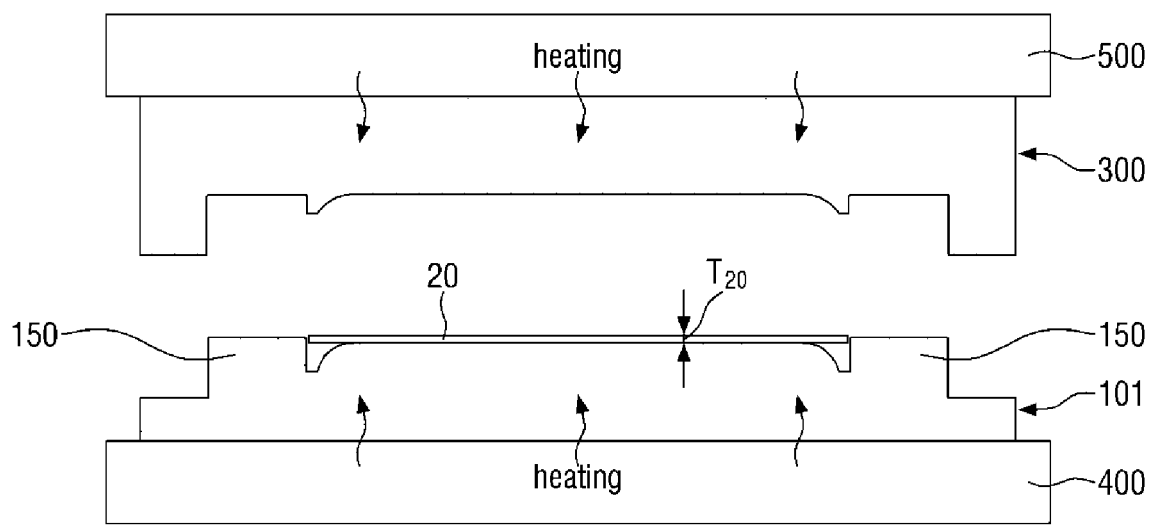
Figure 16:
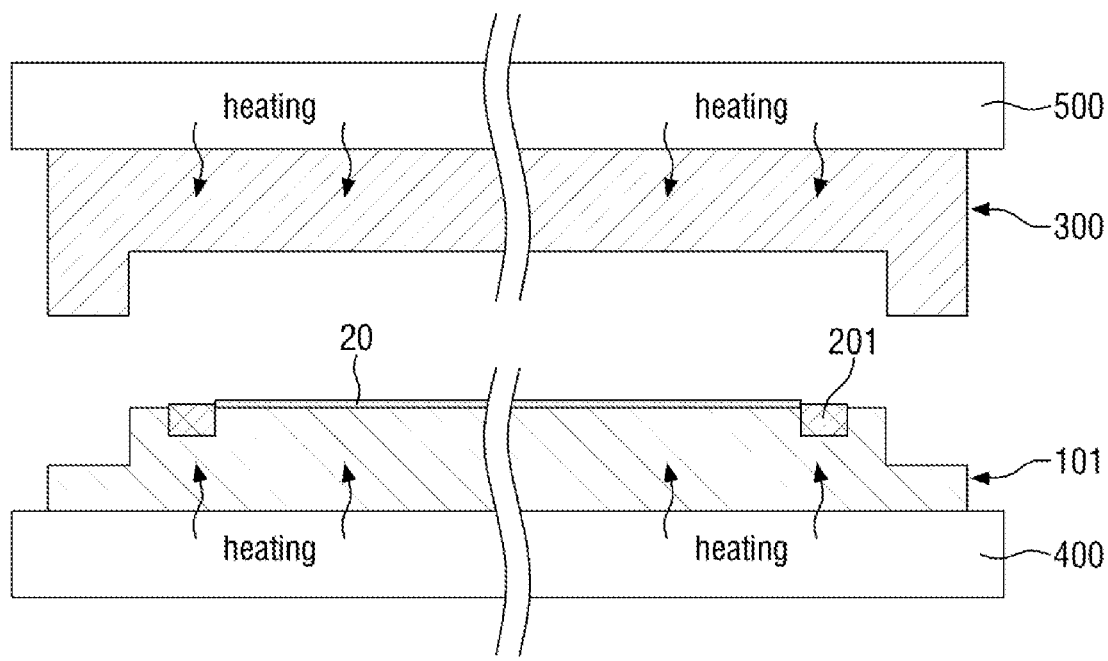
Figure 17:
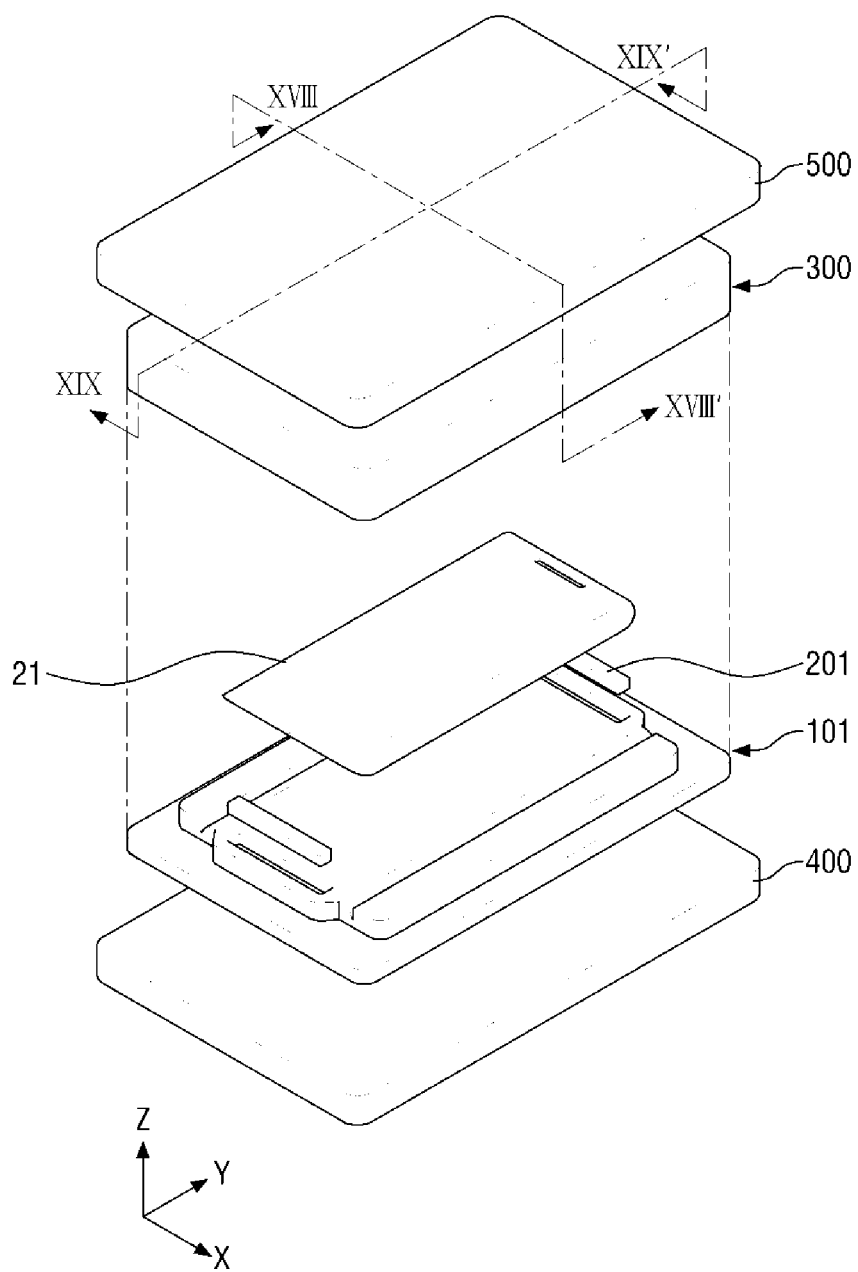
FIGS. 17, 18, and 19 are views illustrating a step of forming bent glass in FIG. 12 according to some exemplary embodiments.
Figure 18:
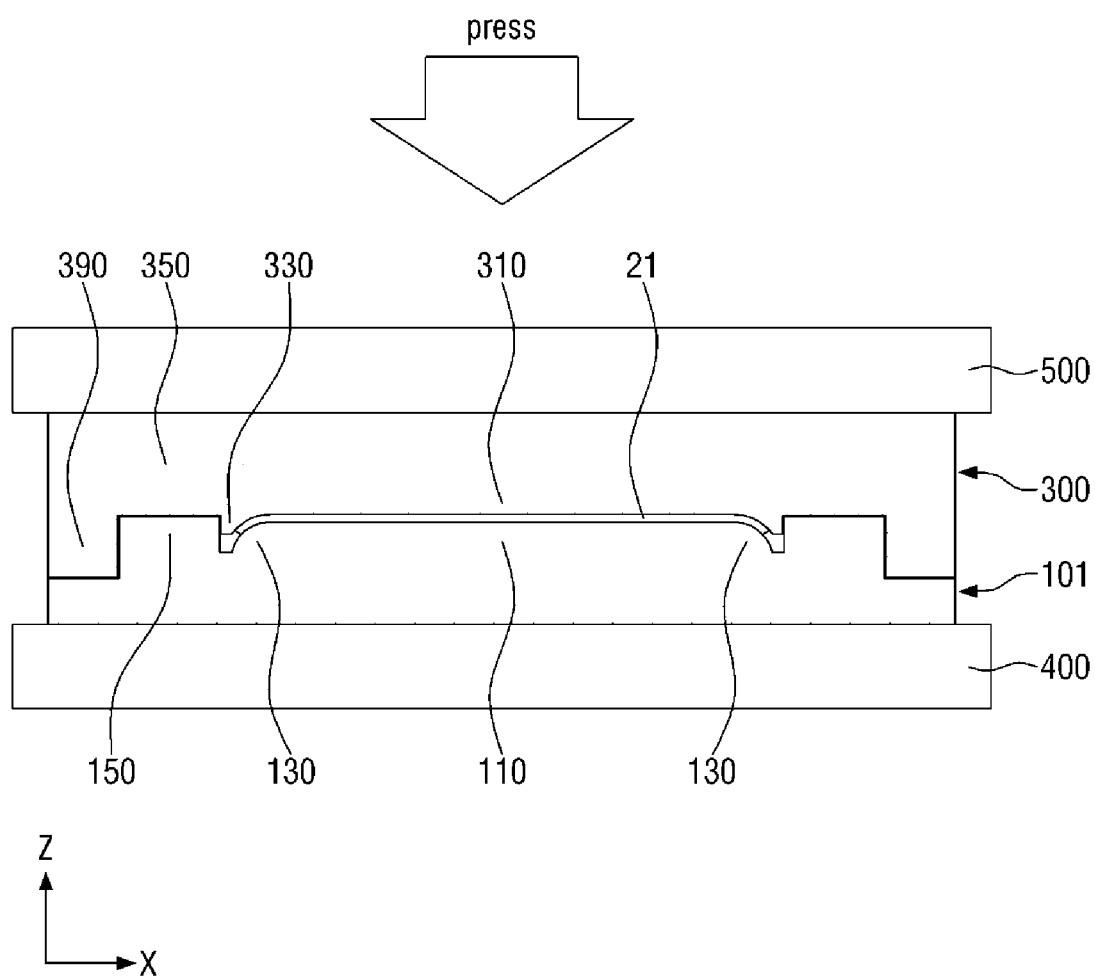
Figure 19:
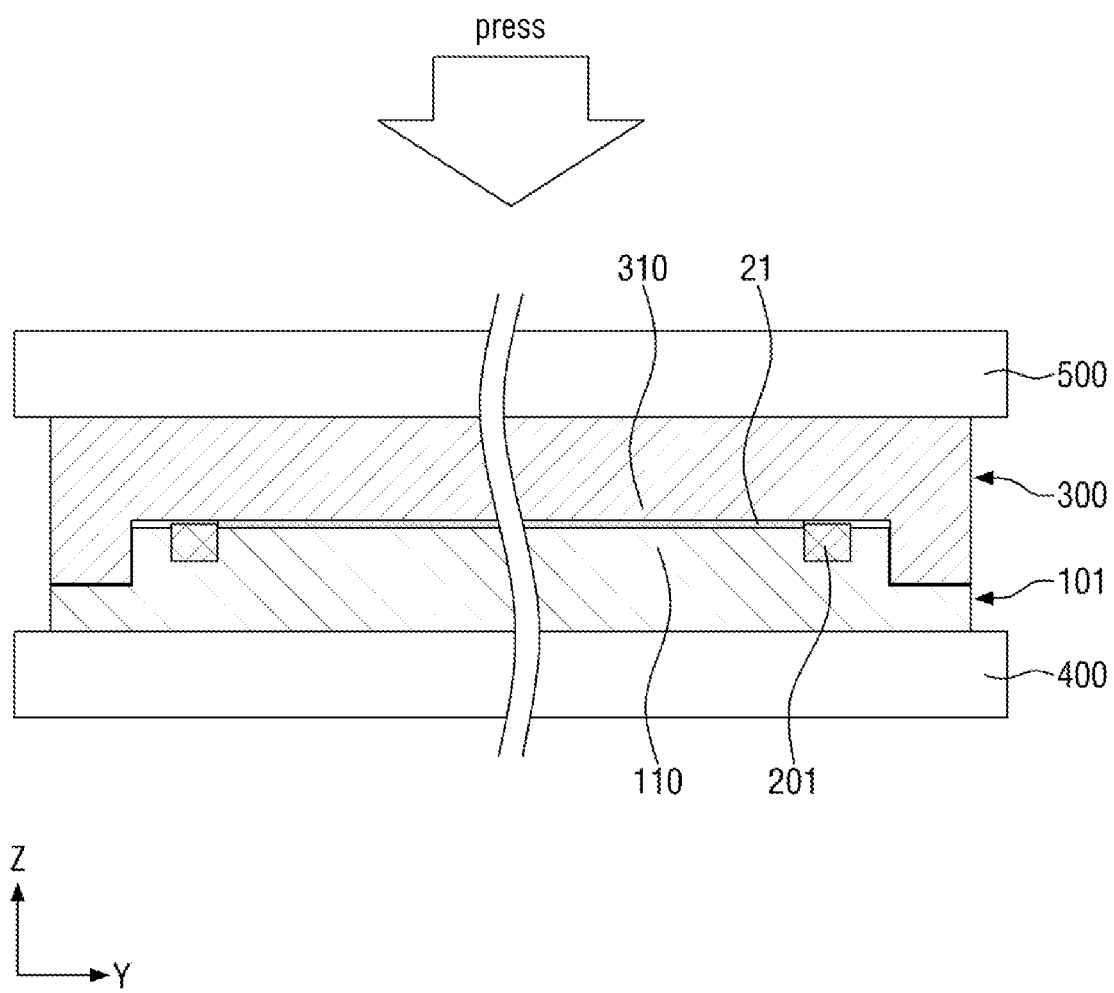

FIG. 13 is a view showing the step S110 of preparing the flat glass 20 of FIG. 12 according some exemplary embodiments. FIG. 14 is a perspective view illustrating the step S130 of interposing the flat glass 20 and the step S140 of heating the flat glass 20 according some exemplary embodiments. FIG. 15 is a cross-sectional view taken along sectional line XV-XV' of FIG. 14 according some exemplary embodiments. FIG. 16 is a cross-sectional view taken along sectional line XVI-XVI' of FIG. 14 according some exemplary embodiments. FIG. 17 is a perspective view illustrating the step S150 of forming the bent glass 21 according some exemplary embodiments. FIG. 18 is a cross-sectional view taken along sectional line XVIII-XVIII' of FIG. 17 according some exemplary embodiments. FIG. 19 is a cross-sectional view taken along sectional line XIX-XIX' of FIG. 17 according some exemplary embodiments.

First, referring to FIG. 13, the step S110 of preparing the flat glass 20 may be a step of preparing a plate-like glass having no rounded surface. That is, the flat glass 20 may refer to a flat glass before bending. In some exemplary embodiments, the step S110 of preparing the flat glass 20 may include a step of preparing a primary glass and a step of partially trimming the primary glass. The trimming step may include a step of partially removing or abrading the vicinity of the corner of the primary glass to allow the primary glass to have a planar round shape and/or a step of forming an opening 20h in the primary glass. As a non-limiting example, the flat glass 20 prepared in the step S110 may be a glass having an opening 20h and having both a front surface and a back surface in a flat state. The opening 20h of the flat glass 20 may be a hole for a speaker, but exemplary embodiments are not limited thereto.

Although not shown, the step S120 of preparing the mold assembly may be a step of preparing the glass bending apparatus 1 including the mold assembly MA, the lower heat source 400, and the upper heat source 500, having been described with reference to FIG. 1 or the like, or preparing the glass bending apparatus 2, having been described with reference to FIG. 10 or the like. Since the glass bending device has been described above, a redundant description will be omitted.

Subsequently, referring to FIGS. 14 to 16, the flat glass 20 is interposed between the lower mold 101 and the upper mold 300 (step S130), and the flat glass 20 is heated (step S140). In some exemplary embodiments, the step S130 of interposing the flat glass 20 between the lower mold 101 and the upper mold 300 may be a step of directly disposing the flat glass 20 on the lower mold 101 in a state where the lower mold 101 and the upper mold 300 are spaced apart from each other by a determined distance.

For example, the flat glass 20 may be placed on the lower glass supporting portion 110 of the lower mold 101, and may be disposed such that the position of the flat glass 20 is guided by the two lower sidewall portions 150 spaced apart from each other in the first direction X and the two guide blocks 201 spaced apart from each other in the second direction Y. More specifically, the side surface of the flat glass 20 in the first direction X may be in contact with or spaced apart from the side surface of the lower sidewall portion 150, and the side surface of the flat glass 20 in the second direction Y may be in contact with or spaced apart from the side surface of the guide block 201, thereby preventing deviation of the position of the flat glass 20.

The thickness $T_{20}$ of the flat glass 20 may be greater than the protruding height of the guide block 201; that is, the difference between the thickness of the guide block 201 ($T_{201}$ in FIG. 7) and the depth of the guide block insert hole ($D_{191}$ in FIG. 7).

The step S140 of heating the flat glass 20 may be performed by the lower heat source 400 and the upper heat source 500. For example, when each of the lower heat source 400 and the upper heat source 500 includes a heating plate, the lower heat source 400 and the upper heat source 500 may be in direct contact with the lower mold 101 and the upper mold 300, respectively. Heat emitted from the lower heat source 400 may be transferred toward the flat glass 20 through the lower mold 101, and heat emitted from the upper heat source 500 may be transferred toward the flat glass 20 through the upper mold 300. The heating temperature of the flat glass 20 may be, for example, about 400° C. to about 800° C., such as about 500° C. to about 700° C.

Subsequently, referring to FIGS. 17 to 19, a bent glass 21 is formed using the lower mold 101 and the upper mold 300 (step S150).

In some exemplary embodiments, the step S150 of forming the bent glass 21 may be a step of attaching the flat glass 20 closely to the lower mold 101 and attaching the flat glass 20 closely to the upper mold 300 to partially bend the flat glass 20. The flat glass 20 having a flat front surface and a flat back surface may be bent by the lower bending forming portion 130 of the lower mold 101 and the upper bending forming portion 330 of the upper mold 300 in a state where the flat glass 20 is stably supported and fixed by the lower glass supporting portion 110 of the lower mold 101 and the upper glass supporting portion 310 of the upper mold 300. When each of the lower bending forming portion 130 and the upper bending forming portion 330 has a forming surface rounded in the first direction X, the flat glass 20 may be bent at least partially in the first direction X to form the bent glass 21. As described above, in step S150, the guide block 201 may be kept in a state where the guide block 201 is spaced apart from the upper mold 300.

In some exemplary embodiments, the step S150 of forming the bent glass 21 may be performed while decreasing the temperature of the glass interposed between the lower mold 101 and the upper mold 300; that is, the glass changed from a flat state to a bent state. The shape corresponding to the mold surfaces of the lower mold 101 and the upper mold 300 may be formed completely by performing a pressing process using the lower mold surface of the lower mold 101 and the upper mold surface of the upper mold 300 while decreasing the temperature of the flat glass 20 heated in the step S140 of heating the flat glass 20.

Heretofore, the method of bending a glass using the glass bending apparatus 1 according to some exemplary embodiments of FIG. 1 or the like has been described, but the glass may also be bent using the glass bending apparatus 2 according to some exemplary embodiments of FIG. 10 or the like.

Hereinafter, various exemplary embodiments will be described in more detail with reference to examples, e.g., Examples 1 and 2.

Example 1

A bent glass was prepared using the glass bending apparatus 1 according to various exemplary embodiments of FIG. 1 or the like. That is, the bent glass was formed using the glass bending apparatus 1 having two guide blocks 201 disposed along the direction of the long side of the glass. The guide blocks 201 were disposed to overlap the hole (e.g., hole 20h) for a speaker formed in the flat glass. In a state where the convex surface of the bent glass prepared according to Example 1 was disposed to face upward, the difference between the minimum level in the vicinity of the edge portion of the long side, that is, the edge portion bent and formed, and the level formed by the edge (edge at corner) was measured.

Example 2

A bent glass was prepared using the glass bending apparatus 2 according to various exemplary embodiments of FIG. 10 or the like. That is, the bent glass was formed using the glass bending apparatus 2 having a total of four guide blocks 202 disposed along the directions of the long side and short side of the glass. The guide blocks 202 were disposed not to overlap the hole (e.g., hole 20h) for a speaker formed in the flat glass. In the state where the convex surface of the bent glass prepared according to Example 2 was disposed to face upward, the difference between the minimum level in the vicinity of the edge portion of the long side, that is, the edge portion bent and formed, and the level formed by the edge was measured.

If a defect of the edge of the bent glass being lifted occurs, the minimum level may be formed at the inside of the edge of the bent glass without being formed at the corner of the edge of the bent glass. That is, the larger the difference between the level of the edge and the minimum level near the edge portion, the greater the degree of the defect of the edge of the bent glass being lifted.

Figure 20:
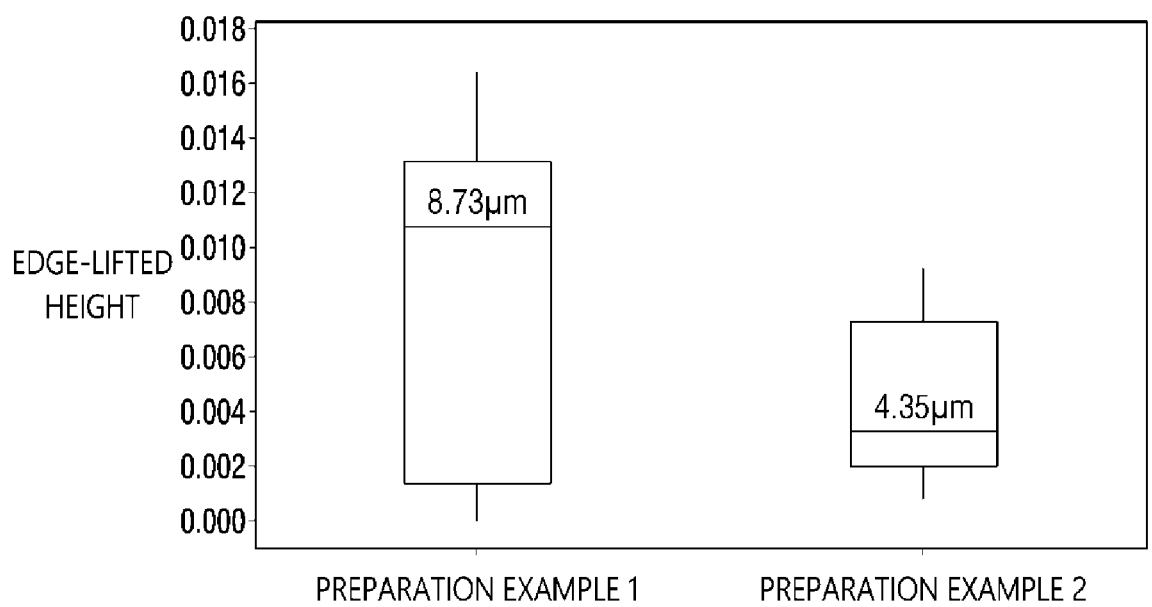
FIG. 20 illustrates results of measuring the lifted heights of edge portions of the bent glasses prepared according to Examples 1 and 2 according to some exemplary embodiments.

FIG. 20 illustrates results of measuring the lifted heights of edge portions of the bent glasses prepared according to Examples 1 and 2 according to some exemplary embodiments.

Referring to FIG. 20, it can be found that all of the bent glasses prepared according to Example 1 and Example 2 have relatively excellent bending accuracy. In particular, the shifted height of the bent glass prepared according to Example 2 in which four guide blocks 202 are disposed was about 4.35 μm, and the shifted height of the bent glass prepared according to Example 1 in which two guide blocks 201 are disposed was about 8.73 μm. That is, it can be found that the bent glass prepared according to Example 2 is further improved in an edge-lifted defect as compared with the bent glass prepared according to Example 1. In other words, it can be found that the edge-lifted defective of the bent glass can be improved according to the arrangement position of the guide blocks.

According to various exemplary embodiments, the position of a glass can be fixed during a glass bending process, and thus, the accuracy of the glass bending process can be improved; however, the advantageous effects are not limited to those mentioned above. This and various other advantageous effects are included herein and/or readily apparent to one of ordinary skill in the art.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A glass bending apparatus configured to at least partially bend a glass in a first direction, the glass bending apparatus comprising:
    a first mold comprising a lower flat surface on which the glass is disposed and guide block insert holes recessed from the lower flat surface; and
    guide blocks respectively inserted into the guide block insert holes, the guide blocks being spaced apart from each other in a second direction intersecting the first direction and defining a maximum dimension for the glass in the second direction,
    wherein, as part of a bending process, the guide blocks spaced apart from each other by the maximum dimension are configured to guide a position of the glass in the second direction as the glass is at least partially bent in the first direction to prevent deviation of the position of the glass in the second direction.

2. The glass bending apparatus of claim 1, wherein:
    the first mold comprises a first supporting portion configured to support the glass thereon during the bending process, the guide block insert holds extending into the first supporting portion in a third direction intersecting the first and second directions; and
    the guide blocks respectively inserted into the guide block insert holes protrude above the first glass supporting portion by a protruding height in the third direction.

3. The glass bending apparatus of claim 1, wherein:
    the first mold comprises:
        a first glass supporting portion comprising a first flat surface; and
        a first bending forming portion disposed at a side of the first glass supporting portion in the first direction, the first bending formation portion comprising a first forming surface rounded in the first direction; and the guide block insert holes are disposed at sides of the first glass supporting portion, the sides of first glass supporting portion opposing one another in the second direction.

4. The glass bending apparatus of claim 3, wherein:
the first mold further comprises a first sidewall portion disposed at a side of the first bending forming portion in the first direction, the first sidewall portion being configured to guide a position of the glass in the first direction to prevent deviation of the position of the glass;
the first forming surface of the first bending forming portion comprises a downward inclination in a direction from the first glass supporting portion toward the first sidewall portion; and
a height formed by an upper surface of the first sidewall portion is greater than a height formed by the first flat surface of the first glass supporting portion.

5. The glass bending apparatus of claim 4, wherein:
the first sidewall portion of the first mold is one of a plurality of first sidewall portions of the first mold, the plurality of first sidewall portions of the first mold being spaced apart from each other; and
a distance between the guide blocks in the second direction is greater than a distance between the plurality of first sidewall portions of the first mold in the first direction.

6. The glass bending apparatus of claim 5, wherein a length in the second direction of the first bending forming portion comprising the first forming surface of the first mold is greater than a distance in the second direction between the guide blocks.

7. The glass bending apparatus of claim 4, wherein:
a side surface of the first sidewall portion of the first mold is spaced apart from the first rounded forming surface of the first bending forming portion of the first mold;
a valley formed by the side surface of the first sidewall portion and the first forming surface of the first bending forming portion comprises a flat surface; and
a depth of the guide block insert hole is greater than a height difference between the upper surface of the first sidewall portion and the flat surface of the valley.

8. The glass bending apparatus of claim 3, wherein:
a thickness of the guide block is greater than a depth of the guide block insert hole;
a height formed by the upper surface of the guide block is greater than a height formed by the first flat surface of the first glass supporting portion of the first mold in a state in which the guide block is inserted into the guide block insert hole of the first mold; and
the guide blocks at least partially overlap the glass in the second direction.

9. The glass bending apparatus of claim 8, wherein:
the guide blocks are spaced apart from each other in the first direction and in the second direction;
a shape of the glass comprises a short side extending in the first direction and a long side extending in the second direction;
a center of the short side of the glass does not overlap the guide block in the second direction; and
an edge of the short side of the glass overlaps the guide block in the second direction.

10. The glass bending apparatus of claim 3, further comprising:
a second mold overlapping the first mold, the second mold being configured to adjust a distance from the first mold;
a first heat source spaced apart from the second mold with the first mold disposed therebetween, the first heat source being configured to transfer heat through the first mold; and
a second heat source spaced apart from the first mold with the second mold disposed therebetween, the second heat source configured to transfer heat through the second mold.

11. The glass bending apparatus of claim 10, wherein:
the second mold comprises:
a second glass supporting portion comprising a second flat surface and overlapping the first glass supporting portion;
a second bending forming portion disposed at a side of the second glass supporting portion in the first direction and overlapping the first bending forming portion, the second bending forming portion comprising a second forming surface rounded in the first direction; and
a sidewall inserting portion disposed at a side of the second bending forming portion in the first direction and overlapping the first sidewall portion of the first mold; and
a distance between the first glass supporting portion and the second glass supporting portion is greater than a distance between the first sidewall portion and the sidewall inserting portion.

12. The glass bending apparatus of claim 11, wherein:
the second mold further comprises a second sidewall portion disposed at a side of the second bending forming portion in the first direction; and
in a state in which the guide block is inserted into the guide block insert hole of the first mold, the guide block and the second mold are spaced apart from each other, a distance between the first glass supporting portion and the second glass supporting portion is greater than a distance between the guide block and the second mold, and the second sidewall portion of the second mold at least partially surrounds the first sidewall portion of the first mold in a plan view.

13. A glass bending mold configured to at least partially bend a glass in a first direction, the glass bending mold comprising:
a glass supporting portion comprising a flat surface on which the glass is disposed;
a bending forming portion disposed at a side of the glass supporting portion in the first direction, the bending forming portion comprising a forming surface rounded in the first direction; and
insert holes recessed from the lower flat surface and disposed at sides of the glass supporting portion, the sides of the glass supporting portion opposing one another in a second direction intersecting the first direction and defining a maximum dimension in the second direction for the glass to rest upon the flat surface as part of a bending process to prevent deviation of the position of the glass in the second direction as the glass is at least partially bent in the first direction.

14. The glass bending mold of claim 13, wherein the insert holes are spaced apart from each other in the first direction and in the second direction.

15. A method of bending a glass, the method comprising:
positioning a lower mold, the lower mold comprising:
a bending forming portion, the bending forming portion comprising a flat surface on which a flat glass is disposed, a surface rounded in a first direction and recessed from the flat surface, and guide block insert holes spaced apart from each other in a second direction intersecting the first direction and recessed from the flat surface; and guide blocks inserted into the guide block insert holes of the lower mold, the guide blocks being spaced apart from each other in the second direction;

positioning an upper mold over and spaced apart from the lower mold;

interposing the flat glass between the lower mold and the upper mold such that a position of the flat glass in the second direction is guided by the guide blocks spaced apart from each other in the second direction; and adjusting a relative position between the lower mold and the upper mold to form a bent glass, the flat glass being at least partially bent in the first direction to form the bent glass, wherein, in a fully compressed state between the lower mold and the upper mold, a maximum distance in a third direction between the bent glass and the upper mold is less than a maximum distance in the third direction between the guide blocks and the upper mold, the third direction being perpendicular to the first and second directions.

16. The method of claim 15, wherein forming the bent glass comprises:

the bent glass being in direct contact with the lower mold and the upper mold; and the guide blocks inserted into the guide block insert holes being spaced apart from the upper mold.

17. The method of claim 15, wherein interposing the flat glass between the lower mold and the upper mold comprises the guide blocks spaced apart from each other guiding a position of the flat glass in the second direction to prevent deviation of a position of the flat glass.

18. The method of claim 15, wherein a thickness of the flat glass is greater than a difference between a thickness of a guide block among the guide blocks and a depth of a guide block insert hole among the guide block insert holes.

19. The method of claim 15, further comprising:

heating the flat glass after interposing the flat glass between the lower mold and the upper mold and before forming the bent glass, wherein forming the bent glass comprises decreasing a temperature of the glass interposed between the lower mold and the upper mold.

20. The method of claim 15, further comprising:

preparing, before interposing the flat glass between the lower mold and the upper mold, a primary glass; and forming, before interposing the flat glass between the lower mold and the upper mold, at least one hole in the primary glass to form the flat glass comprising the at least one hole.

\* \* \* \* \*